United States Patent
Price et al.

(10) Patent No.: US 11,949,492 B2
(45) Date of Patent: Apr. 2, 2024

(54) DATA STREAM OBJECT FOR DEVICE NETWORKING

(71) Applicant: The Boeing Company, Chicago, IL (US)

(72) Inventors: Caleb G. Price, Shiloh, IL (US); Jeffrey H. Hunt, Thousand Oaks, CA (US); Wesley Frank Eder, Saint Louis, MO (US)

(73) Assignee: The Boeing Company, Arlington, VA (US)

( * ) Notice: Subject to any disclaimer, the term of this patent is extended or adjusted under 35 U.S.C. 154(b) by 127 days.

(21) Appl. No.: 17/450,660

(22) Filed: Oct. 12, 2021

(65) Prior Publication Data

US 2023/0111499 A1   Apr. 13, 2023

(51) Int. Cl.
*H04B 7/185* (2006.01)
*H04L 69/164* (2022.01)
*H04W 4/06* (2009.01)

(52) U.S. Cl.
CPC ....... *H04B 7/18506* (2013.01); *H04L 69/164* (2013.01); *H04W 4/06* (2013.01)

(58) Field of Classification Search
None
See application file for complete search history.

(56) References Cited

U.S. PATENT DOCUMENTS

| | | | | |
|---|---|---|---|---|
| 11,196,157 | B1* | 12/2021 | Bonney | G08G 5/0082 |
| 2017/0195627 | A1* | 7/2017 | Sham | G05D 1/0094 |
| 2018/0294871 | A1* | 10/2018 | Kosseifi | H04W 4/026 |
| 2022/0191698 | A1* | 6/2022 | Davis | H04W 12/64 |
| 2023/0074011 | A1* | 3/2023 | Chetlur Ravi | H04B 7/18506 |

* cited by examiner

*Primary Examiner* — Ajit Patel
(74) *Attorney, Agent, or Firm* — Alleman Hall & Tuttle LLP

(57) ABSTRACT

A method for aerial vehicle component networking comprises, for a network-accessible avionics component onboard an aerial vehicle, instantiating a data stream object that specifies a network socket for communication between the network-accessible avionics component and a plurality of other network-accessible aerial vehicle components. A set of outgoing data is defined for transmission over the network socket to one or more onboard unicast aerial vehicle component subscribers of the plurality of other network-accessible aerial vehicle components and two or more onboard or offboard multicast aerial vehicle component subscribers of the plurality of other network-accessible aerial vehicle components. The outgoing data is published to the one or more onboard unicast aerial vehicle component subscribers over the network socket via unicast communication. The outgoing data is published to the two or more onboard or offboard multicast aerial vehicle component subscribers over the network socket via multicast communication.

23 Claims, 7 Drawing Sheets

DATA STREAM OBJECT FOR DEVICE NETWORKING

FIELD

The invention relates generally to networked data communication between different network-accessible devices, and more particularly, to instantiating data stream objects that facilitate such communication.

BACKGROUND

Electronic devices may in some cases communicate over computer networks. For example, an aerial vehicle may include a plurality of different network-accessible aerial vehicle components configured to communicate with one another, and/or communicate with electronic devices external to the aerial vehicle. Different network-accessible devices (e.g., including those found onboard aerial vehicles) can have a wide variety of different hardware and/or software configurations. Furthermore, different network-accessible devices may have different requirements as to the rate at which different types of data should be transmitted and/or received.

SUMMARY

This summary is not an extensive overview of the specification. It is intended to neither identify key or critical elements of the specification nor delineate any scope particular to embodiments of the specification, or any scope of the claims. Its sole purpose is to present some concepts of the specification in a simplified form as a prelude to the more detailed description that is presented in this disclosure.

To address at least the above issues, according to one aspect of the subject disclosure, a method for aerial vehicle component networking comprises, for a network-accessible avionics component onboard an aerial vehicle, instantiating a data stream object that specifies a network socket for communication between the network-accessible avionics component and a plurality of other network-accessible aerial vehicle components. A set of outgoing data is defined for transmission over the network socket to one or more onboard unicast aerial vehicle component subscribers of the plurality of other network-accessible aerial vehicle components and two or more onboard or offboard multicast aerial vehicle component subscribers of the plurality of other network-accessible aerial vehicle components. The outgoing data is published to the one or more onboard unicast aerial vehicle component subscribers over the network socket via unicast communication. The outgoing data is published to the two or more onboard or offboard multicast aerial vehicle component subscribers over the network socket via multicast communication.

The features, functions, and advantages that have been discussed can be achieved independently in various embodiments or can be combined in yet other embodiments, further details of which can be seen with reference to the following description and drawings.

DETAILED DESCRIPTION

Figure 1:
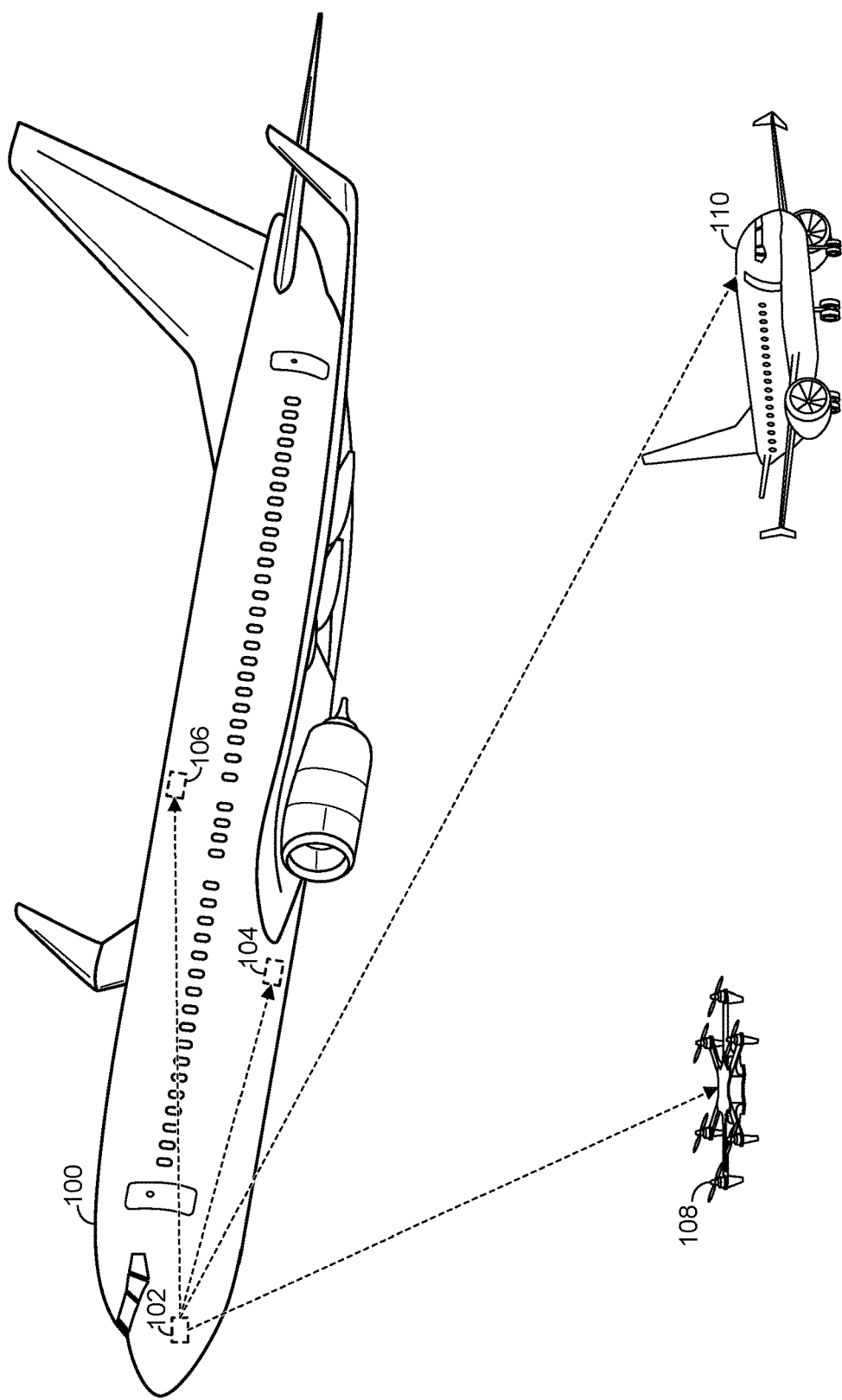
FIG. 1 schematically illustrates network communication between different example network-accessible aerial vehicle components.

FIG. 1 schematically shows an example aerial vehicle 100, and a network-accessible avionics component 102 onboard the aerial vehicle. The network-accessible avionics component is configured to communicate with (e.g., transmit data to, and/or receive data from) a plurality of other network-accessible vehicle components, which may include other components onboard aerial vehicle 100. In this example, the plurality of other network-accessible aerial vehicle components include at least a first aerial vehicle component 104 and a second aerial vehicle component 106. The positions of network-accessible avionics component 102, as well as network-accessible aerial vehicle components 104 and 106, relative to aerial vehicle 100 are non-limiting and should not be construed as corresponding to any specific devices or components onboard any specific aircraft. Furthermore, it will be understood that the techniques described herein may enable network communication between a network-accessible avionics component and any suitable number of other network-accessible aerial vehicle components, regardless of whether such components are onboard the same aerial vehicle as the network-accessible avionics component.

For instance, in FIG. 1, network-accessible avionics component 102 also communicates with network-accessible aerial vehicle components of other aerial vehicles, including vehicles 108 and 110. It will be understood that network-accessible avionics component 102 may communicate with one or more specific network-accessible aerial vehicle components onboard aerial vehicles 108 and 110, although such components are omitted in FIG. 1 for the sake of visual clarity.

Furthermore, it will be understood that the specific aerial vehicles depicted in FIG. 1 (e.g., airplanes and an aerial drone) are non-limiting examples. In general, the techniques described herein may be applied to any suitable aerial vehicles, including airplanes, helicopters, powered gliders, unmanned aerial vehicles (UAVs), etc. Furthermore, although the present disclosure primarily focuses on aerial vehicles, and network communication between aerial vehicle components, it will be understood that this is not limiting. Rather, the techniques described herein may be applied to components of other types of vehicles—e.g., unmanned and/or piloted ground-based vehicles, such as cars, trucks, carts, motorcycles, or robots; unmanned and/or piloted watercraft, such as boats, ships, or barges; and unmanned and/or piloted spacecraft such as satellites, orbital vehicles, or deep space vehicles. Furthermore, it will be understood that the present disclosure is not restricted only to network-accessible vehicle components. Rather, the techniques described herein may be applied to any suitable network-accessible devices (e.g., computing devices), regardless of whether such devices are components of any type of vehicle. As one non-limiting example, the techniques described herein may be implemented by computing system 700 described below with respect to FIG. 7.

With specific reference to "network-accessible avionics components" and "network-accessible aerial vehicle components," it will be understood that this can refer to any components of an aerial vehicle configured to transmit data to and/or receive data from other network-accessible devices—e.g., other components onboard the same aerial vehicle, and/or network-accessible devices external to the aerial vehicle. In cases where a network-accessible avionics component communicates with network-accessible devices external to the aerial vehicle, such devices can take any suitable form. For instance, these can include network-accessible components of another aerial vehicle, ground-based stations (e.g., air traffic control towers), orbital satellites, etc.

As non-limiting examples, "network-accessible avionics components" and "network-accessible aerial vehicle components" can refer to flight control systems, navigation systems, flight recorders, engine control systems, threat detection systems, communications systems, weather monitoring systems, lighting systems, performance monitors, in-flight entertainment systems, etc. In general, the techniques described herein may be implemented by any components of an aerial vehicle that include suitable logic componentry, data storage componentry, and/or network interface componentry for network communication with other network-accessible devices.

Figure 2:
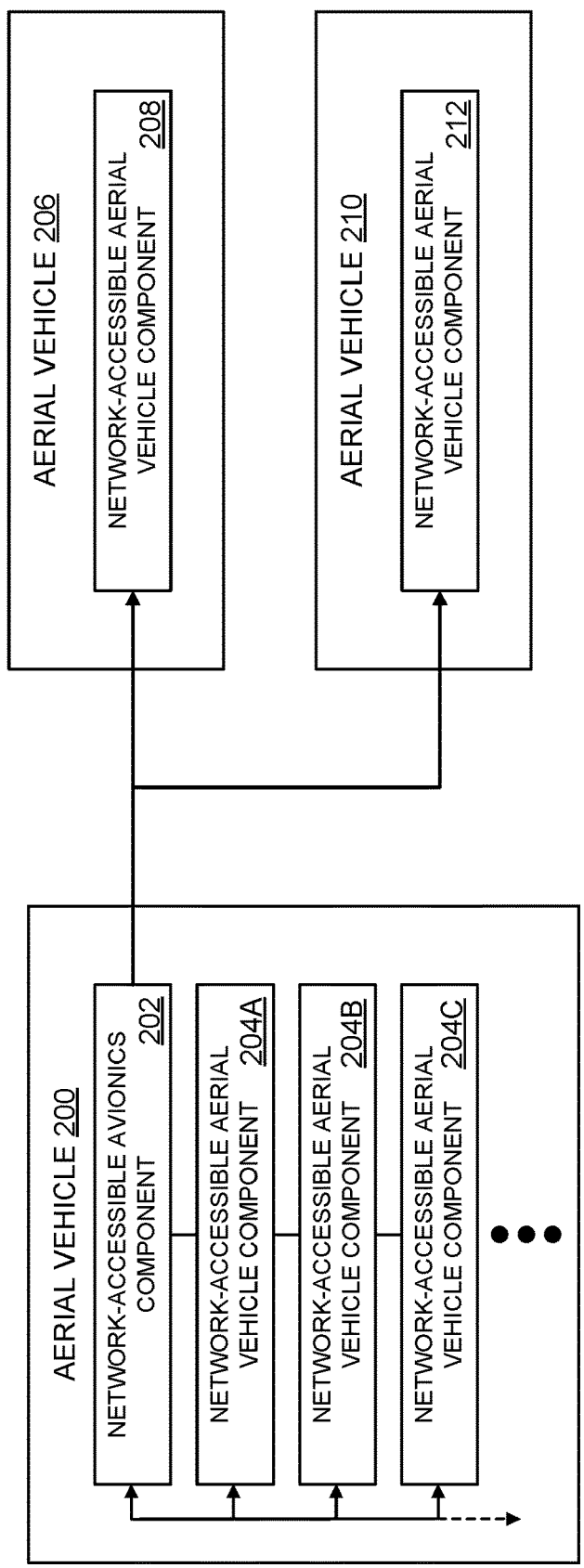
FIG. 2 schematically illustrates network communication between a network-accessible avionics component and a plurality of other network-accessible aerial vehicle components.

Network communication between a plurality of different network-accessible aerial vehicle components is also schematically illustrated with respect to FIG. 2. Specifically, FIG. 2 includes a schematic representation of an aerial vehicle 200, which includes a network-accessible avionics component 202 and a plurality of other network-accessible aerial vehicle components, including components 204A, 204B, 204C, etc. Any or all of components 202 and 204A-C may transmit data to, and/or receive data from, one another. Such transmission may be direct, and/or indirect (e.g., facilitated by one or more intermediate relays, such as network routers, hubs, or switches).

Similarly, any or all of components 202 and 204A-C may transmit data to, and/or receive data from network-accessible components of other aerial vehicles. FIG. 2 further shows schematic representations of another aerial vehicle 206, which includes at least one network-accessible aerial vehicle component 208, and an aerial vehicle 210, which includes at least one network-accessible aerial vehicle component 212. It will be understood that the techniques described herein may be applied to network communication between any number of different aerial vehicles, including only one aerial vehicle. Furthermore, each aerial vehicle may include any suitable number of network-accessible components, any or all of which may communicate with one another, with network-accessible components of other aerial vehicles, and/or with other external network-accessible devices.

The specific medium by which different network-accessible devices (e.g., aerial vehicle components) communicate with one another may vary depending on the implementation. In general, the techniques described herein may beneficially address deficiencies in existing network communication protocols, such as the user datagram protocol (UDP). For network-accessible aerial vehicle components onboard the same aerial vehicle, such components may communicate over a wired network and/or wirelessly via a wireless communication protocol (e.g., Wi-Fi). Such connections may be peer-to-peer and/or use a client/server model. Any communication between network-accessible components may pass through one or more intermediary devices, such as network routers, switches, or hubs. Data transmission may use unicast communication, multicast communication, broadcast communication, point-to-multipoint communication, etc. In cases where a network-accessible aerial vehicle component communicates with one or more network-accessible devices external to the aerial vehicle, such communication may occur, for example, via radio transmission through a transmitter onboard the aerial vehicle. In some cases, such transmissions may be relayed through one or more intermediary relay points—e.g., ground stations and/or satellites. Furthermore, the techniques described herein may apply to timed transmissions and/or events—e.g., scenarios where data is transmitted from one device to another at fixed and/or disparate time intervals.

As discussed above, different network-accessible devices (e.g., including those found onboard aerial vehicles) can have a wide variety of different hardware and/or software configurations. For example, different network-accessible components onboard the same aerial vehicle may use different operating systems that may not natively support equivalent communication techniques—e.g., protocols, standards. Furthermore, different network-accessible devices may have different requirements as to the rate at which different types of data should be transmitted and/or received. This can complicate efforts to facilitate network communication between different network-accessible devices in a manner that is standardized and consistent across different device types.

Accordingly, the present disclosure is directed to techniques for network communication in which a network-accessible device (e.g., a network-accessible avionics component) instantiates a data stream object that facilitates network communication with a plurality of other network-accessible devices (e.g., other network-accessible aerial vehicle components). Specifically, the data stream object defines a set of outgoing data for transmission over a network socket to a plurality of other network-accessible devices, where the other network-accessible devices may include either or both of unicast data subscribers and multicast data subscribers. The data stream object may publish the outgoing data to the plurality of other network-accessible devices at one or more different transmission timing frequencies, which may differ from a reception timing frequency at which the network-accessible device receives incoming data.

In this manner, the techniques described herein may beneficially enable network communication between a plurality of different network-accessible devices in a manner that is computationally lightweight while remaining platform agnostic (e.g., supporting different hardware and/or software configurations). A data stream object as described herein may support both unicast and multicast communication, and may beneficially enable publishing data to different subscribers at different transmission timing frequencies via a timer maintained by the data stream object. Data transmission and data reception may be implemented via separate transmit and receive threads, where the receive thread may be consumed by one or more software applications on the network-accessible device that instantiates the data stream object.

The present disclosure primarily focuses on a single network-accessible device instantiating a data stream object, such as a network-accessible avionics component onboard an aerial vehicle. Such a network-accessible device may communicate with a plurality of other network-accessible devices, any or all of which may instantiate similar data stream objects. However, the techniques described herein may beneficially enable network communication with one or more other network-accessible devices, regardless of whether such devices instantiate equivalent data stream objects—e.g., the data stream object may support communication with network-accessible devices configured to communicate in other ways.

Figure 3:
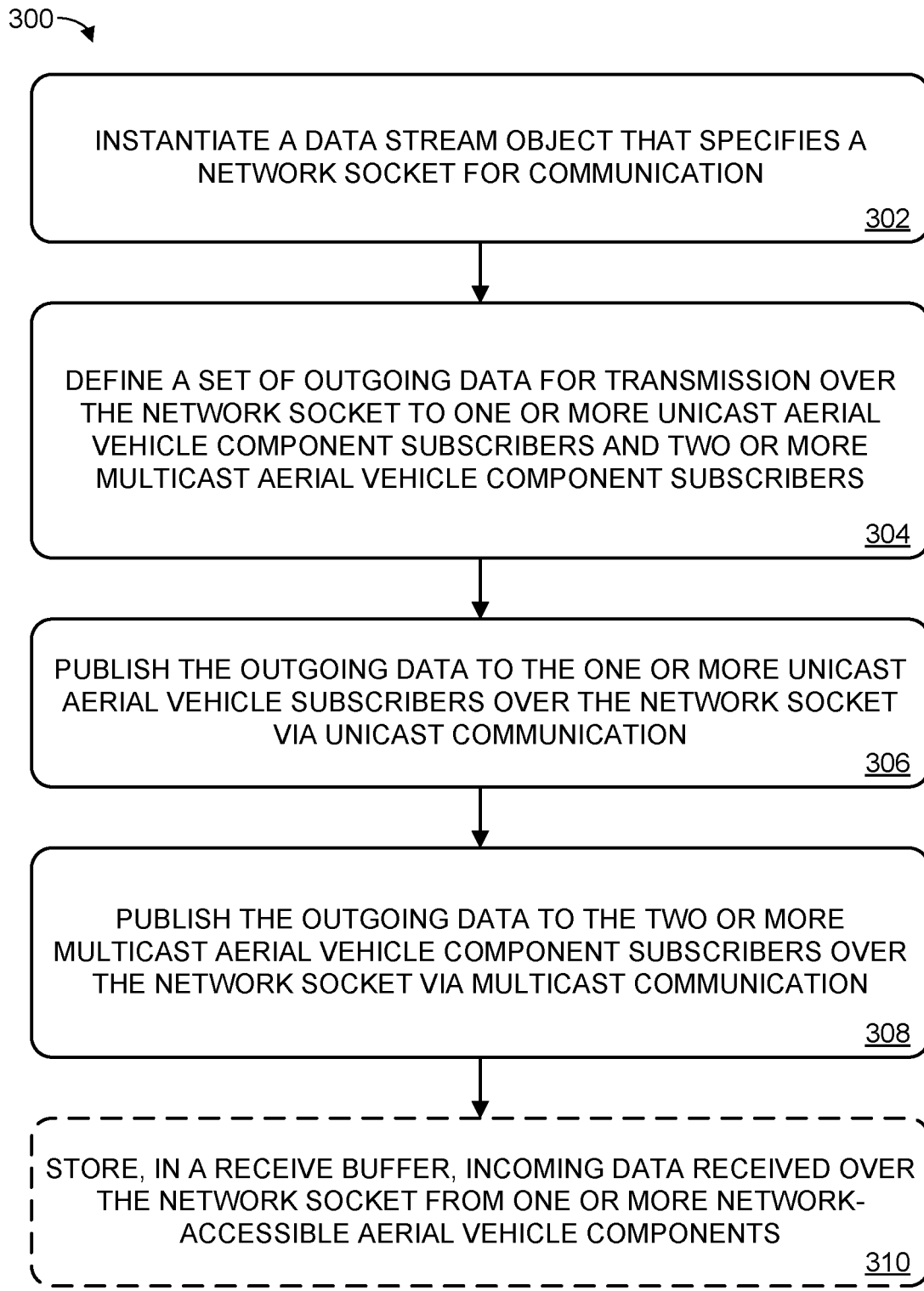
FIG. 3 illustrates an example method for aerial vehicle component networking.

FIG. 3 illustrates an example method 300 for aerial vehicle component networking. Method 300 may be implemented by any suitable network-accessible component of an aerial vehicle—e.g., a network-accessible avionics component as described above. In general, however, method 300 may be implemented by any suitable network-accessible device, having any suitable capabilities, hardware configuration, and form factor. In some examples, method 300 may be implemented by computing system 700 described below with respect to FIG. 7.

At 302, method 300 includes, for a network-accessible avionics component onboard an aerial vehicle, instantiating a data stream object that specifies a network socket for communication between the network-accessible avionics component and a plurality of other network-accessible aerial vehicle components. This is schematically illustrated with respect to FIG. 4, in which a network-accessible avionics component 400 instantiates a data stream object 402. The data stream object specifies a network socket 404 for communication between the network-accessible avionics component and a plurality of other network-accessible aerial vehicle components, as will be described in more detail below.

The data stream object may be implemented in any suitable way, as any suitable computer data structure. The data stream object may be specified by any suitable computer programming language—e.g., an object-oriented programming language such as C/C++. In some cases, the data stream object may be instantiated from a native networking library on the network-accessible avionics component. The networking library may, for example, take the form of a user datagram program (UDP) networking library. Thus, the network socket specified by the data stream object may be a UDP network socket. Additionally, or alternatively, any other suitable networking protocol may be used. This may beneficially enable the data stream object to be instantiated by any network-accessible device that includes a suitable networking library—e.g., a data stream object as described herein may be instantiated by network-accessible devices having disparate hardware and/or software configurations. The techniques described herein may beneficially be applied to a wide variety of different operating systems and chipset configurations.

Returning briefly to FIG. 3, at 304, method 300 includes defining a set of outgoing data for transmission over the network socket to one or more onboard unicast aerial vehicle component subscribers of the plurality of other network-accessible aerial vehicle components, and/or two or more onboard or offboard multicast aerial vehicle component subscribers of the plurality of other network-accessible aerial vehicle components. This is also schematically illustrated with respect to FIG. 4, in which network-accessible avionics component 400 defines a set of outgoing data 406 for transmission over network socket 404 to at least one unicast subscriber 408 and two or more multicast subscribers 410A and 410B. Unicast subscriber 408 may, for example, be onboard the same aerial vehicle as network-accessible avionics component 400, while multicast subscribers 410A and 410B may me onboard or offboard the aerial vehicle. In general, however, a network-accessible avionics component of an aerial vehicle may communicate with any suitable number of other network-accessible devices, regardless of whether they are onboard the same aerial vehicle, as discussed above.

The outgoing data for transmission to the one or more unicast data subscribers and two or more multicast data subscribers may take any suitable form. The outgoing data may, for example, include data stored on a data storage subsystem of the network-accessible avionics component. The outgoing data may include data output by one or more software applications of the network-accessible avionics component. The outgoing data may include data collected by one or more sensors—e.g., barometers, thermometers, accelerometers, global positioning system (GPS) sensors, and/or other suitable sensors. The outgoing data may include data that was previously received by the network-accessible avionics component from one or more other network-accessible devices, onboard or offboard the aerial vehicle. It will be understood that the techniques described herein may be adapted to transmission and/or reception of any type of computer data, regardless of the specific form that such data takes.

The data stream object may track the set of subscribers to the outgoing data in any suitable way. In some cases, the network-accessible avionics component may create separate events stored by the data stream object, where the different events specify different subscribers or sets of subscribers to the outgoing data. Each different event may take the form of any suitable computer data structure, depending on the implementation—e.g., the specific computer programming language used to implement the data stream object. For instance, time-tags and IP+port configuration tracks may be created to maintain network statistics (e.g., last message transmit/receive, time-out values for transmit/receive).

Figure 4:
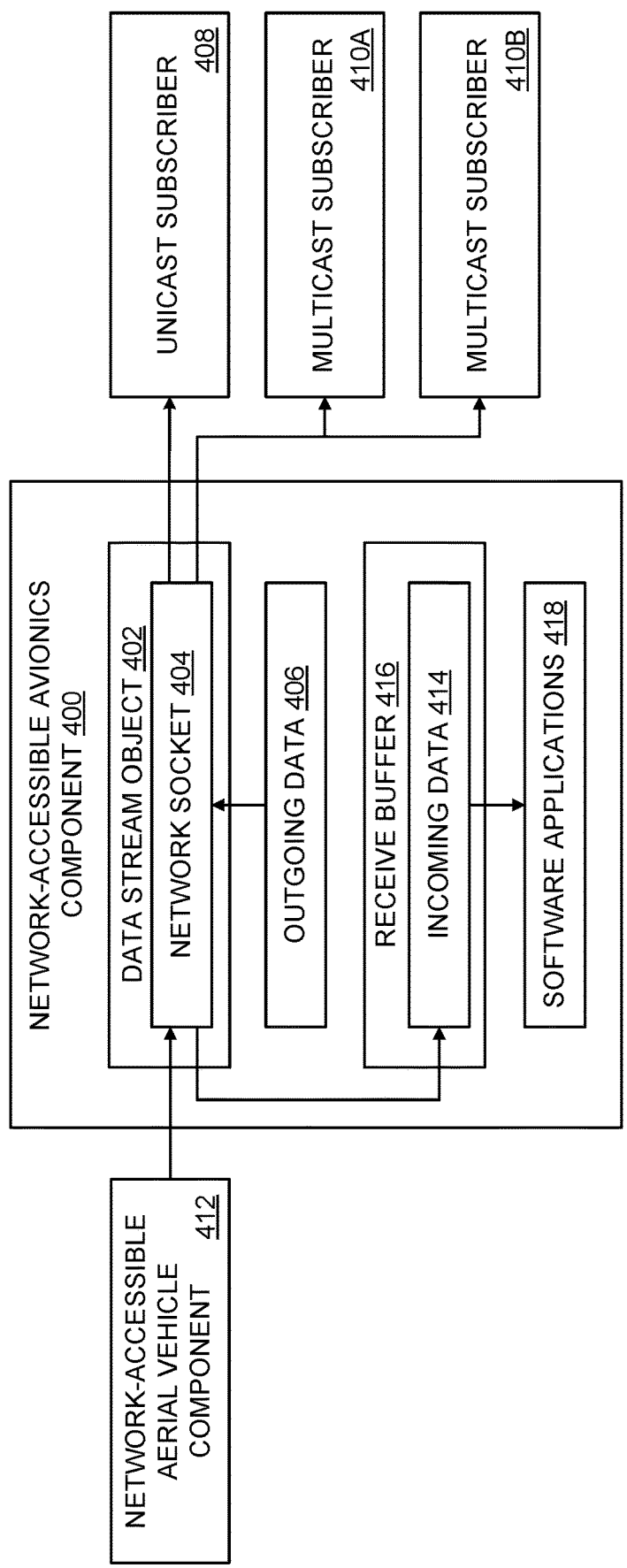
FIG. 4 schematically depicts a network-accessible avionics component instantiating a data stream object.
Figure 5:
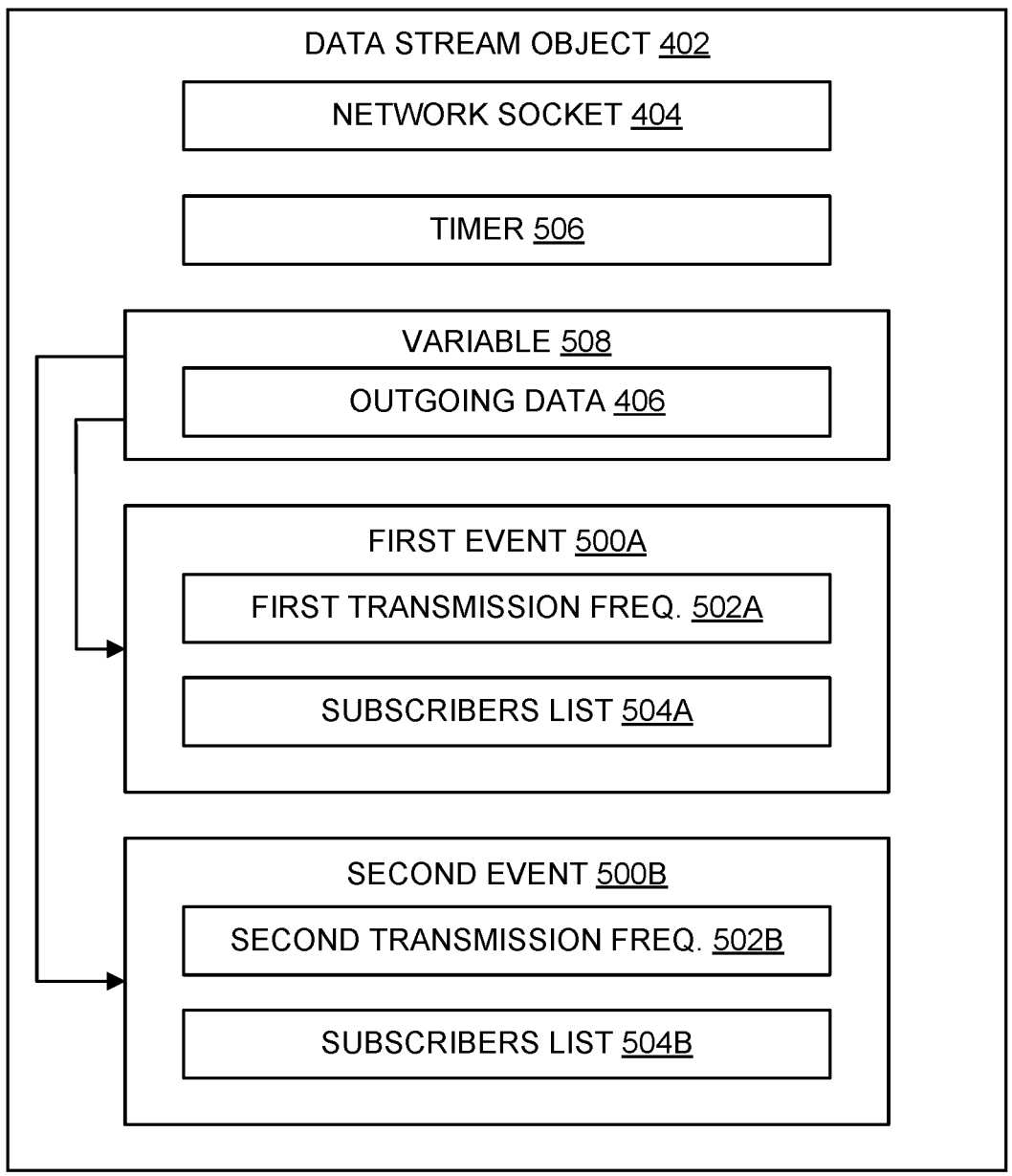
FIG. 5 schematically depicts different example events specifying different transmission timing frequencies at which outgoing data is to be published.

This is illustrated with respect to FIG. 5, which shows another schematic representation of data stream object 402 and network socket 404. As shown, the network-accessible avionics component creates a first event 500A associated with the outgoing data, where the first event specifies a first transmission timing frequency 502A at which the first event is to be published to the one or more onboard unicast aerial vehicle component subscribers. In FIG. 5, first event 500A is associated with a first subscribers list 504A that specifies which data subscribers should receive the outgoing data at the first transmission timing frequency—e.g., the subscribers list may identify unicast subscriber 408 of FIG. 4. The subscribers list may specify the network-accessible aerial vehicle components in any suitable way—e.g., via hardware device identifiers such as media access control (MAC) addresses, and/or network addresses (such as Internet protocol addresses) at which the network-accessible aerial vehicle components can be accessed.

The list of data subscribers may be populated in any suitable way. As one non-limiting example, the list of data subscribers for an event may be manually created by a human user during configuration of the network-accessible avionics component. The techniques described herein may beneficially enable a human user to add new subscribers to a set of outgoing data via creation of a new event, which may be done by adding as few as three lines of code. Additionally, or alternatively, a list of data subscribers may be populated automatically—e.g., by one or more software applications of the network-accessible avionics component.

In FIG. 5, the network-accessible avionics component also creates a second event 500B associated with the outgoing data, where the second event specifies a second transmission timing frequency 502B at which the second event is to be published to the two or more onboard or offboard multicast aerial vehicle component subscribers. In FIG. 5, second event 500B is associated with a second subscribers list 504B that specifies which data subscribers should receive the outgoing data at the second transmission timing frequency—e.g., the second subscribers list may identify multicast subscribers 410A and 410B of FIG. 4.

In some examples, the second transmission timing frequency may be different from the first transmission timing frequency. In other words, the data stream object may maintain an arbitrary number of different events, corresponding to different data subscribers or groups of subscribers. Each different event may specify a different transmission timing frequency at which the outgoing data is to be published to data subscribers corresponding to that event. This may beneficially enable the data stream object to transmit data to a variety of different network-accessible devices, each having different requirements as to the rate at which data should be received.

Furthermore, in some cases, the first transmission timing frequency and the second transmission timing frequency may be tracked by a timer maintained by the data stream object itself. This is also schematically illustrated with respect to FIG. 5, in which data stream object 402 maintains a timer 506. The timer may, for example, be implemented using <chrono> in the C++ programming language, although it will be understood that a timer may be implemented in any suitable way, depending on the implementation—e.g., the specific computer programming language used, and/or other software/hardware related configuration details of the network-accessible avionics component. Maintaining a timer at the data stream object itself may beneficially simplify implementation of the data stream object on different network-accessible devices having different software configurations—e.g., different operating systems.

The outgoing data may be associated with the different events maintained by the data stream object in any suitable way. In one example, defining the set of outgoing data may include defining a variable that specifies the outgoing data. The network-accessible avionics component may then bind the variable to any or all events maintained by the data stream object, corresponding to different data subscribers that should receive the outgoing data. For example, a caller software application of the network-accessible avionics component may specify transmission intervals and provide a reference address for the outgoing data. Scheduling and execution of periodic events may be maintained by a network library of the network-accessible avionics component. The caller software application may add any number of different events to be enacted a single time, and/or repeated any number of suitable times.

This is schematically illustrated in FIG. 5, showing a variable 508 that specifies outgoing data 406. The network-accessible avionics component may bind variable 508 to first event 500A and second event 500B, allowing the variable to be published to the data subscribers specified by the different events at corresponding transmission timing frequencies. The specific manner in which the variable is defined and bound to the different events will depend on the implementation—e.g., the specific computer programming languages used, and/or other software/hardware configuration details of the network-accessible avionics component.

Returning briefly to FIG. 3, at 306, method 300 includes publishing the outgoing data to the one or more onboard unicast aerial vehicle component subscribers over the network socket via unicast communication. As discussed above, this may include, for example, publishing a variable that specifies the outgoing data to the one or more onboard unicast aerial vehicle subscribers at a first transmission timing frequency specified by an event to which the variable is bound.

At 308, method 300 includes publishing the outgoing data to the two or more onboard or offboard multicast aerial vehicle component subscribers over the network socket via multicast communication. As discussed above, this may include, for example, publishing a variable that specifies the outgoing data to the two or more onboard or offboard multicast aerial vehicle subscribers at a second transmission timing frequency specified by an event that the variable is bound to. Furthermore, publishing the outgoing data to the two or more onboard or offboard multicast aerial vehicle component subscribers may include publishing the outgoing data to at least one multicast aerial vehicle component subscriber onboard the aerial vehicle, and to at least one multicast aerial vehicle component subscriber that is offboard and located on another aerial vehicle.

The present disclosure has thus far focused primarily on transmission of data from the network-accessible avionics device to a plurality of other network-accessible aerial vehicle components. However, it will be understood that a network-accessible aerial vehicle component may additionally or alternatively receive incoming data from one or more other network-accessible aerial vehicle components. Accordingly, at 310, method 300 optionally includes storing, in a receive buffer, incoming data received over the network socket from one or more network-accessible aerial vehicle components of the plurality of other network-accessible aerial vehicle components.

This is schematically illustrated with respect to FIG. 4. Specifically, in FIG. 4, network-accessible avionics component 400 receives, from a network-accessible aerial vehicle component 412, a set of incoming data 414, and stores the incoming data in a receive buffer 416. As with outgoing data 406, incoming data 414 may take any suitable form and have any suitable origin—e.g., the incoming data may include data output by one or more software applications and/or collected by one or more sensors. Once received, the incoming data may be used by the network-accessible avionics component in any suitable way. In some examples, one or more software applications of the network-accessible avionics component may read the incoming data from the receive buffer. This is also shown in FIG. 4, in which one or more software applications 418 of the network-accessible avionics component read the incoming data from the receive buffer. Furthermore, any or all of the incoming data stored in the receive buffer may be transmitted by the network-accessible avionics component to one or more other network-accessible aerial vehicle components, as discussed above.

The receive buffer may be implemented in any suitable way. For example, the receive buffer may have any suitable size in computer bytes. In some cases, the receive buffer may be implemented as a circular buffer. In other words, as incoming data is received, the network-accessible avionics component may overwrite some incoming data already stored in the receive buffer. In other examples, the receive buffer may be implemented in another suitable way—e.g., the buffer may increase in size as new incoming data is received, or the network-accessible avionics component may use other suitable criteria for determining when existing data in the receive buffer should be overwritten with newly-received incoming data.

The network-accessible avionics component may receive incoming data at any suitable frequency. In some cases, the incoming data may be received at a reception timing frequency that is independent from a transmission timing frequency at which the outgoing data is published to either or both of the one or more onboard unicast aerial vehicle component subscribers and the two or more onboard or offboard multicast aerial vehicle component subscribers. For example, the timing frequency at which the incoming data is received may be different from either or both of the first transmission timing frequency 502A and the second transmission timing frequency 502B described above with respect to FIG. 5. The frequency at which the incoming data is received may be dictated by the network-accessible aerial vehicle component that transmits the data.

The above description focused on the network-accessible avionics component receiving the incoming data from a single network-accessible aerial vehicle component. It will be understood, however, that the network-accessible avionics component may receive incoming data from any suitable number of different network-accessible aerial vehicle components, any or all of which may be onboard or offboard the aerial vehicle. Furthermore, each set of incoming data may be received at a different reception timing frequency. In some cases, the network-accessible avionics component may maintain separate receive buffers for incoming data received from different network-accessible aerial vehicle components.

In some examples, network-accessible avionics component may handle data transmission and data reception in separate transmit and receive threads. However, a user of the network-accessible avionics component may optionally override the receive thread with their own user-defined thread manager—e.g., to support specific data requirements of one or more software applications installed on the network-accessible avionics component.

Figure 6:
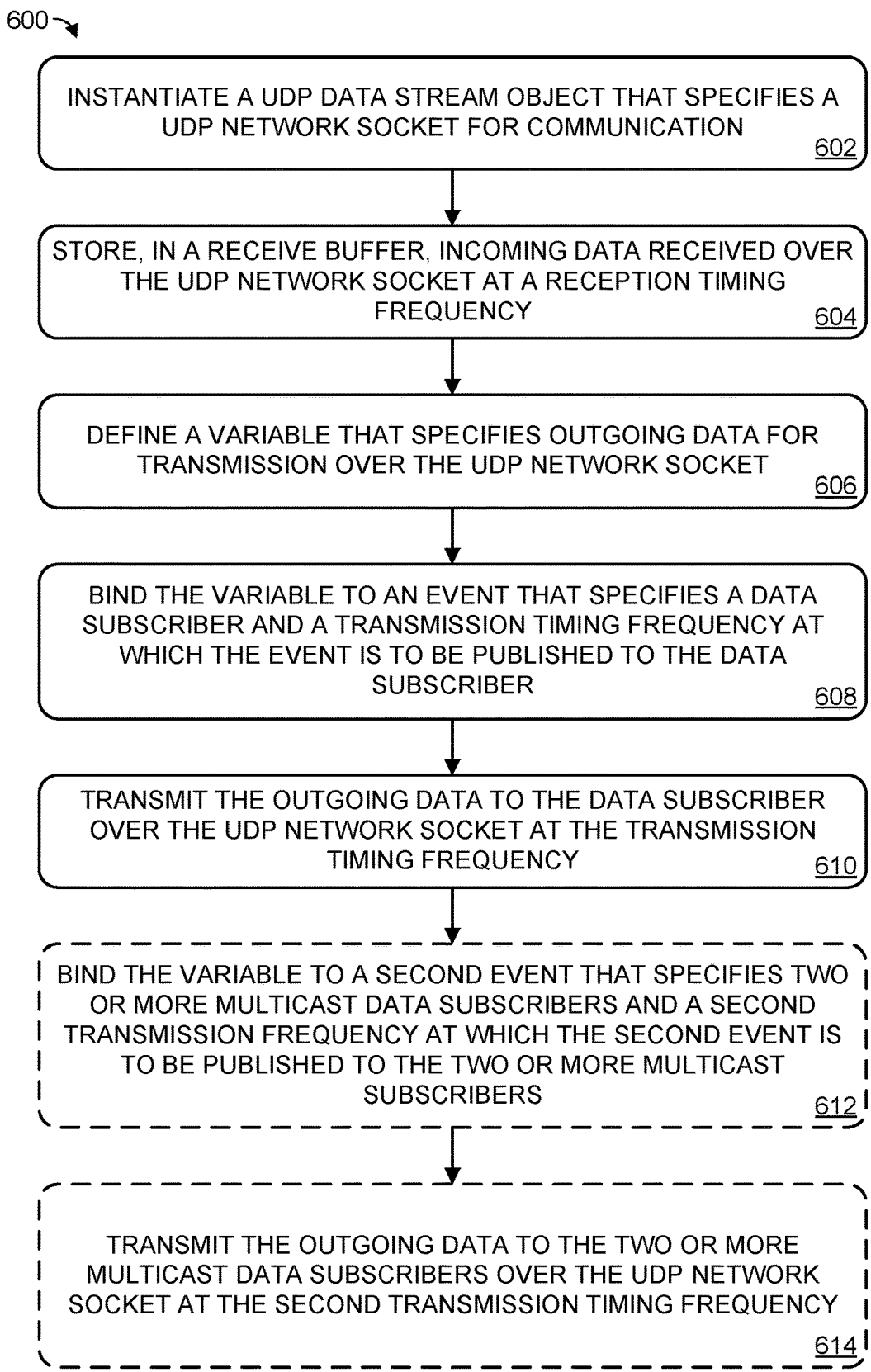
FIG. 6 illustrates an example method for user datagram protocol (UDP) communication.

The present disclosure has thus far focused primarily on network communication between network-accessible components of one or more aerial vehicles. However, as discussed above, the techniques described herein may generally be applied to network-communication between a plurality of different network-accessible devices, regardless of whether such devices are vehicle components. FIG. 6 illustrates an example method 600 for user datagram protocol (UDP) communication, which may be implemented by any suitable network-accessible device, having any suitable capabilities, hardware configuration, and form factor. In some examples, method 600 may be implemented by computing system 700 described below with respect to FIG. 7.

At 602, method 600 includes, for a network-accessible device, instantiating a UDP data stream object that specifies a UDP network socket for communication between the network-accessible device and a plurality of other network-accessible devices. This may be done substantially as described above with respect to FIG. 4. The network-accessible device may, for example, be a component of an aerial vehicle. In such cases, one or more network-accessible devices of the plurality of other network-accessible devices may be integrated into a different aerial vehicle from the network-accessible device.

At 604, method 600 includes storing, in a receive buffer, incoming data received over the UDP network socket, the incoming data received at a reception timing frequency. This may be done substantially as described above with respect to FIG. 4. In some cases, one or more software applications of the network-accessible device may read the incoming data from the receive buffer.

At 606, method 600 includes defining a variable that specifies outgoing data for transmission over the UDP network socket. This may be done substantially as described above with respect to FIG. 5.

At 608, method 600 includes binding the variable to an event that specifies a data subscriber and a transmission timing frequency at which the event is to be published to the data subscriber. This may be done substantially as described above with respect to FIG. 5. In some examples, the transmission timing frequency may be independent of (e.g., different from) the reception timing frequency at which the incoming data is received.

At 610, method 600 includes transmitting the outgoing data to the data subscriber over the UDP network socket at the transmission timing frequency. This may be done substantially as described above with respect to FIGS. 4 and 5. In this case, the "data subscriber" corresponds to one or more other network-accessible devices of the plurality of other network-accessible devices. For instance, the "data subscriber" may be a unicast data subscriber, and thus the outgoing data may be transmitted over the UDP network socket via unicast communication. As another example, the network-accessible device may transmit the outgoing data to two or more data subscribers via multicast communication.

In some examples, as discussed above, the outgoing data may be transmitted to multiple different data subscribers. For instance, the transmission timing frequency may be a first transmission timing frequency, specifying a rate at which the outgoing data should be transmitted to one or more unicast data subscribers. Accordingly, at 612, method 600 optionally includes binding the variable to a second event that specifies two or more multicast data subscribers, and a second transmission timing frequency at which the event is to be published to the two or more multicast data subscribers. Continuing with FIG. 6, at 614, method 600 optionally includes transmitting the outgoing data to the two or more multicast data subscribers over the UDP network socket at the second transmission timing frequency.

As discussed above, the second transmission timing frequency may be different from the first transmission timing frequency. Thus, the network-accessible device may transmit the outgoing data to multiple different data subscribers at multiple independent transmission frequencies. Furthermore, the first transmission frequency and the second transmission frequency may in some cases be tracked by a timer maintained by the UDP data stream object itself, as described above with respect to FIG. 5.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 7:
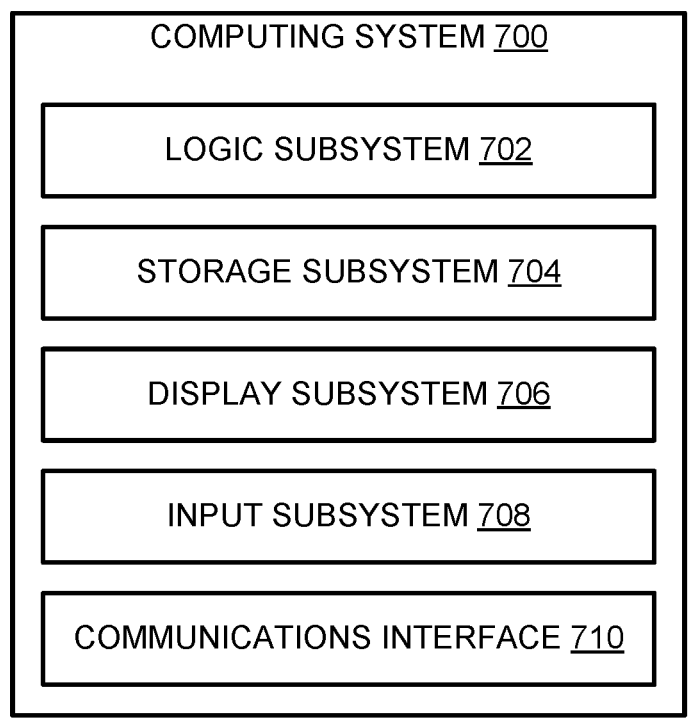
FIG. 7 schematically shows an example computing system.

FIG. 7 schematically shows a simplified representation of a computing system 700 configured to provide any to all of the compute functionality described herein. Computing system 700 may take the form of one or more network-accessible devices (e.g., network-accessible avionics components, network-accessible aerial vehicle components), personal computers, server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 700 includes a logic subsystem 702 and a storage subsystem 704. Computing system 700 may optionally include a display subsystem 706, input subsystem 708, communication subsystem 710, and/or other subsystems not shown in FIG. 7.

Logic subsystem 702 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 704 includes one or more physical devices configured to temporarily and/or permanently hold computer information such as data and instructions executable by the logic subsystem. When the storage subsystem includes two or more devices, the devices may be collocated and/or remotely located. Storage subsystem 704 may include volatile, nonvolatile, dynamic, static, read/write, read-only, random-access, sequential-access, location-addressable, file-addressable, and/or content-addressable devices. Storage subsystem 704 may include removable and/or built-in devices. When the logic subsystem executes instructions, the state of storage subsystem 704 may be transformed—e.g., to hold different data.

Aspects of logic subsystem 702 and storage subsystem 704 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 706 may be used to present a visual representation of data held by storage subsystem 704. This visual representation may take the form of a graphical user interface (GUI). Display subsystem 706 may include one or more display devices utilizing virtually any type of technology. In some implementations, display subsystem may include one or more virtual-, augmented-, or mixed reality displays.

When included, input subsystem 708 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 710 may be configured to communicatively couple computing system 700 with one or more other computing devices. Communication subsystem 710 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for aerial vehicle component networking comprises: for a network-accessible avionics component onboard an aerial vehicle, instantiating a data stream object that specifies a network socket for communication between the network-accessible avionics component and a plurality of other network-accessible aerial vehicle components; defining a set of outgoing data for transmission over the network socket to one or more onboard unicast aerial vehicle component subscribers of the plurality of other network-accessible aerial vehicle components and two or more onboard or offboard multicast aerial vehicle component subscribers of the plurality of other network-accessible aerial vehicle components; publishing the outgoing data to the one or more onboard unicast aerial vehicle component subscribers over the network socket via unicast communication; and publishing the outgoing data to the two or more onboard or offboard multicast aerial vehicle component subscribers over the network socket via multicast communication. In this example or any other example, the method further comprises creating a first event associated with the outgoing data, the first event specifying a first transmission timing frequency at which the first event is to be published to the one or more onboard unicast aerial vehicle component subscribers. In this example or any other example, the method further comprises creating a second event associated with the outgoing data, the second event specifying a second transmission timing frequency at which the second event is to be published to the two or more onboard or offboard multicast aerial vehicle component subscribers. In this example or any other example, the second transmission timing frequency is different from the first transmission timing frequency. In this example or any other example, defining the set of outgoing data includes defining a variable that specifies the outgoing data, and the method further comprises binding the variable to the first event and binding the variable to the second event. In this example or any other example, the first transmission timing frequency and the second transmission timing frequency are tracked by a timer maintained by the data stream object. In this example or any other example, the method further comprises storing, in a receive buffer, incoming data received over the network socket from one or more network-accessible aerial vehicle components of the plurality of other network-accessible aerial vehicle components. In this example or any other example, the incoming data is received at a reception timing frequency that is independent from a transmission timing frequency at which the outgoing data is published to either or both of the one or more onboard unicast aerial vehicle component subscribers and the two or more onboard or offboard multicast aerial vehicle component subscribers. In this example or any other example, one or more software applications of the network-accessible avionics component read the incoming data from the receive buffer. In this example or any other example, publishing the outgoing data to the two or more onboard or offboard multicast aerial vehicle component subscribers comprises publishing the outgoing data to at least one multicast aerial vehicle component subscriber onboard the aerial vehicle, and to at least one multicast aerial vehicle component subscriber that is offboard and located on another aerial vehicle. In this example or any other example, the network socket is a user datagram protocol (UDP) network socket. For example, the network-accessible avionics component onboard the aerial vehicle is configured to instantiate a data stream object for network communication with an onboard multicast aerial vehicle component subscriber comprising an onboard GPS sensor (where the data stream object defines a set of outgoing data for transmission over a network socket and creates a first event associated with the outgoing data that specifies a first transmission timing frequency at which outgoing data is published to the GPS sensor), and further configured to instantiate a data stream object for network communication with a multicast aerial vehicle component subscriber that is off-board and located on an unmanned aerial vehicle (where the data stream object defines a set of outgoing data for transmission over a network socket and creates a second event associated with the outgoing data that specifies a second transmission timing frequency at which outgoing data is published to the offboard component of the unmanned aerial vehicle), such that the network-accessible avionics component enables separate distinct publications at different transmission timing frequencies that correspond (or bind) to both an onboard GSP sensor/component subscriber and an off-board communications component subscriber located on an unmanned aerial vehicle. The network-accessible avionics component onboard the aerial vehicle can track a first transmission timing frequency and the second transmission timing frequency (using a timer maintained by the UDP data stream object) to enable network communication respectively with an onboard multicast aerial vehicle component of a GPS sensor and a remote offboard unmanned aerial vehicle, to facilitate communication of locations for situational awareness or avoidance of nearby aerial vehicles, for example.

In an example, a method for user datagram protocol (UDP) communication comprises: for a network-accessible device, instantiating a UDP data stream object that specifies a UDP network socket for communication between the network-accessible device and a plurality of other network-accessible devices; storing, in a receive buffer, incoming data received over the UDP network socket, the incoming data received at a reception timing frequency; defining a variable that specifies outgoing data for transmission over the UDP network socket; binding the variable to an event that specifies a data subscriber and a transmission timing frequency at which the event is to be published to the data subscriber, the transmission timing frequency being independent of the reception timing frequency, and the data subscriber corresponding to one or more other network-accessible devices of the plurality of other network-accessible devices; and transmitting the outgoing data to the data subscriber over the UDP network socket at the transmission timing frequency. In this example or any other example, the data subscriber is a unicast data subscriber, and wherein the outgoing data is transmitted over the UDP network socket via unicast communication. In this example or any other example, the transmission timing frequency is a first transmission timing frequency, and the method further comprises binding the variable to a second event that specifies two or more multicast data subscribers and a second transmission timing frequency at which the second event is to be published to the two or more multicast data subscribers. In this example or any other example, the second transmission timing frequency is different from the first transmission timing frequency. In this example or any other example, the first transmission timing frequency and the second transmission timing frequency are tracked by a timer maintained by the UDP data stream object. In this example or any other example, one or more software applications of the network-accessible device read the incoming data from the receive buffer. In this example or any other example, the network-accessible device is a component of an aerial vehicle. In this example or any other example, one or more network-accessible devices of the plurality of other network-accessible devices are integrated into a different aerial vehicle from the network-accessible device.

In an example, a network-accessible avionics component comprises: a logic subsystem; and a storage subsystem holding instructions executable by the logic subsystem to: instantiate a data stream object that specifies a network socket for communication between the network-accessible avionics component onboard an aerial vehicle and a plurality of other network-accessible aerial vehicle components; defining a set of outgoing data for transmission over the network socket to one or more onboard unicast aerial vehicle component subscribers of the plurality of other network-accessible aerial vehicle components, and two or more onboard or offboard multicast aerial vehicle component subscribers of the plurality of other network-accessible aerial vehicle components; publishing the outgoing data to the one or more onboard unicast aerial vehicle component subscribers over the network socket via unicast communication; and publishing the outgoing data to the two or more onboard or offboard multicast aerial vehicle component subscribers over the network socket via multicast communication. In this example or any other example, the network accessible avionics component is further configured to create a first event associated with the outgoing data, the first event specifying a first transmission timing frequency at which the first event is to be published to the one or more onboard unicast aerial vehicle component subscribers. In this example or any other example, the network accessible avionics component is further configured to create a second event associated with the outgoing data, the second event specifying a second transmission timing frequency at which the second event is to be published to the two or more onboard or offboard multicast aerial vehicle component subscribers, wherein the second transmission timing frequency is different from the first transmission timing frequency. In this example or any other example, the network accessible avionics component is configured to define a variable that specifies the outgoing data, and configured to bind the variable to the first event and bind the variable to the second event.

The invention claimed is:

1. A method for aerial vehicle component networking, the method comprising:
    for a network-accessible avionics component onboard an aerial vehicle, instantiating a data stream object that specifies a network socket for communication between the network-accessible avionics component and a plurality of other network-accessible aerial vehicle components;
    defining a set of outgoing data for transmission over the network socket to one or more onboard unicast aerial vehicle component subscribers of the plurality of other network-accessible aerial vehicle components and two or more onboard or offboard multicast aerial vehicle component subscribers of the plurality of other network-accessible aerial vehicle components;
    publishing the outgoing data to the one or more onboard unicast aerial vehicle component subscribers over the network socket via unicast communication; and
    publishing the outgoing data to the two or more onboard or offboard multicast aerial vehicle component subscribers over the network socket via multicast communication.

2. The method of claim 1, further comprising creating a first event associated with the outgoing data, the first event specifying a first transmission timing frequency at which the first event is to be published to the one or more onboard unicast aerial vehicle component subscribers.

3. The method of claim 2, further comprising creating a second event associated with the outgoing data, the second event specifying a second transmission timing frequency at which the second event is to be published to the two or more onboard or offboard multicast aerial vehicle component subscribers.

4. The method of claim 3, wherein the second transmission timing frequency is different from the first transmission timing frequency.

5. The method of claim 3, wherein defining the set of outgoing data includes defining a variable that specifies the outgoing data, and wherein the method further comprises binding the variable to the first event and binding the variable to the second event.

6. The method of claim 3, wherein the first transmission timing frequency and the second transmission timing frequency are tracked by a timer maintained by the data stream object.

7. The method of claim 1, further comprising storing, in a receive buffer, incoming data received over the network socket from one or more network-accessible aerial vehicle components of the plurality of other network-accessible aerial vehicle components.

8. The method of claim 7, wherein the incoming data is received at a reception timing frequency that is independent from a transmission timing frequency at which the outgoing data is published to either or both of the one or more onboard unicast aerial vehicle component subscribers and the two or more onboard or offboard multicast aerial vehicle component subscribers.

9. The method of claim 7, wherein one or more software applications of the network-accessible avionics component read the incoming data from the receive buffer.

10. The method of claim 1, wherein publishing the outgoing data to the two or more onboard or offboard multicast aerial vehicle component subscribers comprises publishing the outgoing data to at least one multicast aerial vehicle component subscriber onboard the aerial vehicle, and to at least one multicast aerial vehicle component subscriber that is offboard and located on another aerial vehicle.

11. The method of claim 1, wherein the network socket is a user datagram protocol (UDP) network socket.

12. A network-accessible avionics component, comprising:
    a logic subsystem; and
    a storage subsystem holding instructions executable by the logic subsystem to:
        instantiate a data stream object that specifies a network socket for communication between the network-accessible avionics component onboard an aerial vehicle and a plurality of other network-accessible aerial vehicle components;
        defining a set of outgoing data for transmission over the network socket to one or more onboard unicast aerial vehicle component subscribers of the plurality of other network-accessible aerial vehicle components, and two or more onboard or offboard multicast aerial vehicle component subscribers of the plurality of other network-accessible aerial vehicle components;
        publishing the outgoing data to the one or more onboard unicast aerial vehicle component subscribers over the network socket via unicast communication; and
        publishing the outgoing data to the two or more onboard or offboard multicast aerial vehicle component subscribers over the network socket via multicast communication.

13. The network-accessible avionics component of claim 12, wherein the network accessible avionics component is further configured to create a first event associated with the outgoing data, the first event specifying a first transmission timing frequency at which the first event is to be published to the one or more onboard unicast aerial vehicle component subscribers.

14. The network accessible avionics component of claim 13, wherein the network accessible avionics component is further configured to create a second event associated with the outgoing data, the second event specifying a second transmission timing frequency at which the second event is to be published to the two or more onboard or offboard multicast aerial vehicle component subscribers, wherein the second transmission timing frequency is different from the first transmission timing frequency.

15. The network accessible avionics component of claim 14, wherein the network accessible avionics component is configured to define a variable that specifies the outgoing data, and configured to bind the variable to the first event and bind the variable to the second event.

16. The network accessible avionics component of claim 14, wherein the first transmission timing frequency and the second transmission timing frequency are tracked by a timer maintained by the data stream object.

17. The network accessible avionics component of claim 12, wherein the instructions are further executable to store, in a receive buffer, incoming data received over the network socket from one or more network-accessible aerial vehicle components of the plurality of other network-accessible aerial vehicle components.

18. The network accessible avionics component of claim 17, wherein the incoming data is received at a reception timing frequency that is independent from a transmission timing frequency at which the outgoing data is published to either or both of the one or more onboard unicast aerial vehicle component subscribers and the two or more onboard or offboard multicast aerial vehicle component subscribers.

19. The network accessible avionics component of claim 17, wherein one or more software applications of the network-accessible avionics component read the incoming data from the receive buffer.

20. The network accessible avionics component of claim 12, wherein publishing the outgoing data to the two or more onboard or offboard multicast aerial vehicle component subscribers comprises publishing the outgoing data to at least one multicast aerial vehicle component subscriber onboard the aerial vehicle, and to at least one multicast aerial vehicle component subscriber that is offboard and located on another aerial vehicle.

21. The network accessible avionics component of claim 12, wherein the network socket is a user datagram protocol (UDP) network socket.

22. A method for aerial vehicle component networking, the method comprising:
for a network-accessible avionics component onboard an aerial vehicle, instantiating a data stream object that specifies a user datagram protocol (UDP) network socket for communication between the network-accessible avionics component and a plurality of other network-accessible aerial vehicle components;
defining a set of outgoing data for transmission over the UDP network socket to one or more onboard unicast aerial vehicle component subscribers of the plurality of other network-accessible aerial vehicle components and two or more onboard or offboard multicast aerial vehicle component subscribers of the plurality of other network-accessible aerial vehicle components;
publishing the outgoing data to the one or more onboard unicast aerial vehicle component subscribers over the UDP network socket via unicast communication;
publishing the outgoing data to the two or more onboard or offboard multicast aerial vehicle component subscribers over the UDP network socket via multicast communication; and
storing, in a receive buffer, incoming data received over the UDP network socket from one or more network-accessible aerial vehicle components of the plurality of other network-accessible aerial vehicle components, wherein one or more software applications of the network-accessible avionics component read the incoming data from the receive buffer.

23. The method of claim 22, wherein the incoming data is received at a reception timing frequency that is independent from a transmission timing frequency at which the outgoing data is published to either or both of the one or more onboard unicast aerial vehicle component subscribers and the two or more onboard or offboard multicast aerial vehicle component subscribers.

* * * * *